United States Patent
Youngwerth et al.

(10) Patent No.: US 9,822,828 B2
(45) Date of Patent: Nov. 21, 2017

(54) EXPANDING FRICTION DISK CONFIGURABLE TO BE COMPATIBLE WITH WEAR LINERS AND IMPROVED FRICTION DISKS

(71) Applicant: REKLUSE MOTOR SPORTS, INC., Boise, ID (US)

(72) Inventors: Albert James Youngwerth, Boise, ID (US); Sean G. Brown, Boise, ID (US); Karl E. Jensen, Boise, ID (US); Logan P. Krueger, Boise, ID (US)

(73) Assignee: Rekluse Motor Sports, Inc., Boise, ID (US)

( * ) Notice: Subject to any disclaimer, the term of this patent is extended or adjusted under 35 U.S.C. 154(b) by 195 days.

(21) Appl. No.: 14/748,033

(22) Filed: Jun. 23, 2015

(65) Prior Publication Data
US 2015/0369305 A1  Dec. 24, 2015

Related U.S. Application Data

(60) Provisional application No. 62/015,978, filed on Jun. 23, 2014.

(51) Int. Cl.
*F16D 43/12* (2006.01)
*F16D 13/64* (2006.01)
*F16D 43/08* (2006.01)

(52) U.S. Cl.
CPC ........... *F16D 43/12* (2013.01); *F16D 13/648* (2013.01); *F16D 43/08* (2013.01); *F16D 2250/0084* (2013.01); *Y10T 29/49718* (2015.01)

(58) Field of Classification Search
CPC .... F16D 13/48; F16D 2069/009; F16D 43/12; F16D 43/08
See application file for complete search history.

(56) References Cited

U.S. PATENT DOCUMENTS

| | | | |
|---|---|---|---|
| 7,021,440 B2 | 4/2006 | Monahan | |
| 7,287,632 B1* | 10/2007 | Taylor | F16D 13/58 |
| | | | 192/70.17 |
| 7,823,713 B1* | 11/2010 | Overton | F16D 25/086 |
| | | | 192/103 A |
| 8,123,017 B2 | 2/2012 | Overton | |
| 2005/0000775 A1* | 1/2005 | Drussel | F16D 43/12 |
| | | | 192/105 B |
| 2005/0133337 A1* | 6/2005 | AbuSamra | F16D 43/12 |
| | | | 192/105 CP |
| 2008/0099300 A1 | 5/2008 | Youngwerth et al. | |
| 2009/0242351 A1 | 10/2009 | Youngwerth, Jr. et al. | |
| 2010/0200352 A1 | 8/2010 | Williams | |
| 2013/0168198 A1* | 7/2013 | Youngwerth | F16D 13/683 |
| | | | 192/107 M |

* cited by examiner

Primary Examiner — Ramya Burgess
Assistant Examiner — Lori Wu
(74) Attorney, Agent, or Firm — Robert L. Shaver; Scott D. Swanson; Shaver & Swanson, LLP

(57) ABSTRACT

An improved expanding friction disk for use in a clutch of a power transmission system. The improved expanding friction disk accommodates multiple clutch pack configurations including clutch packs utilizing novel improved friction disks, is compatible with wear liners and operates with reduced friction including a reduced difference between the static and dynamic coefficients of friction in the ramp mechanism.

17 Claims, 14 Drawing Sheets

EXPANDING FRICTION DISK CONFIGURABLE TO BE COMPATIBLE WITH WEAR LINERS AND IMPROVED FRICTION DISKS

PRIORITY/CROSS-REFERENCE TO RELATED APPLICATIONS

This application claims the benefit of U.S. Provisional Application No. 62/015,978, filed Jun. 23, 2014 the disclosure of which is incorporated by reference.

TECHNICAL FIELD

The presently disclosed technology relates to vehicle clutches, and more particularly to clutches with expanding friction disks.

BACKGROUND

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

Typically, such clutch systems include a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system. The clutch system incorporated in a 2011 Honda CRF-450R represents a typical prior art clutch system.

Most motorcycles incorporate a manual transmission coupled to the engine via a multi-plate clutch assembly. Typically, the multi-plate clutch is engaged/disengaged by the driver via a clutch lever mounted on the handlebar. Although the clutch lever operated clutch allows the driver to control the clutch engagement/disengagement, often times motorcycle drivers find the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

U.S. patent application Ser. No. 12/412,245 discloses an automatic clutch system incorporating an expanding friction disk and is incorporated herein by reference.

U.S. patent application Ser. No. 13/338,535 discloses a wear liner and improved friction disks and is incorporated herein by reference.

U.S. patent application Ser. No. 14/094,144 discloses an improved friction disk design and is incorporated herein by reference.

The prior art shows expanding friction disk designs comprised of centrifugal weights housed between a first plate and a second plate where the first plate and second plate are compressed together with biasing springs wherein the centrifugal weights, first plate and second plate contain features which provide a sliding contact interface between them with at least one side of the interface being a ramp mechanism. The ramp mechanism provides the relative lift to create expansion when the centrifugal weights move outwardly and overcome the biasing springs due to centrifugal force. In some designs the centrifugal weights are ball bearings which slide in grooves formed into either the first plate or second plate.

Although sliding contact between these parts and the respective ramp features provides good performance, there are application and design limitations associated with incorporating sliding contact between the centrifugal weights, first plate and second plate. These limitations include losses due to friction from the surface on surface sliding contact interfaces which can make optimizing the engagement and disengagement RPM difficult. In some cases the friction between the sliding contact areas is accentuated due to the presence of static and dynamic coefficient of friction differences inherent with sliding bearing interfaces. The friction loss and static to dynamic coefficient of friction transition can force the user to run an engagement point significantly higher than normal idle speed so that the disengagement point does not cause the engine to stall as the centrifugal weights return to their collapsed positions when engine RPM drops to idle. The engagement point is the RPM threshold where the centrifugal force of the centrifugal weights overcomes the biasing springs causing the expanding friction disk to expand causing the clutch pack and pressure plate to be pressurize resulting in the vehicle beginning to move. When the engagement point exceeds approximately 200 RPM above normal idle speed, the compression braking relied upon by many users is not adequate and a free-wheel affect can take place when the centrifugal weights return fully to their starting position and the clutch pack and pressure plate are no longer pressurized.

The static to dynamic coefficient of friction transition can also cause abrupt clutch engagement, which in certain terrain situations can make controlling power delivery from the engine to the drive train difficult resulting in a loss of traction at the driving wheel or wheels. This abruptness is preempted by the user having to rev the engine to a higher RPM than what the user would expect making it difficult to adapt to using the expanding friction disk while operating the vehicle.

The prior art shows the use of two vertically stacked ball bearings to provide rolling contact between adjacent parts. Although two vertically stacked ball bearings resolves the friction issues inherent with a sliding surface contact, the design is prone to wearing the mating features in the respective parts. Applied to an expanding friction disk, the parts prone to wear are the first plate and second plate which are in contact with the two vertically stacked ball bearings. When the first plate and second plate wear, the function of the expanding friction disk is degraded leading to clutch failure.

Therefore a need exists for an improved expanding friction disk assembly design which reduces friction specifically the difference between static and dynamic coefficient of friction at the base side and centrifugal weight interfaces and eliminates premature wear increasing the useful life of the expanding friction disk.

An expanding friction disk is significantly thicker than the standard friction disk it is intended to replace. Therefore, when using an expanding friction disk it is required to replace other clutch parts to accommodate the increased thickness of the expanding friction disk in order to maintain the same total number of friction surfaces as the original clutch included with the vehicle. The friction surfaces in a clutch correspond to the adjacent faces in contact between friction disks and drive plates which are interleaved within a clutch pack. Maintaining the same number of friction surfaces allows the compressive force transmitted through the pressure plate to remain the same and therefore maintains the same clutch lever pull force for the user while maintaining the same torque capacity within the clutch system.

Alternatively, an expanding friction disk can be used without replacing other clutch parts to accommodate the increased thickness of the expanding friction disk. In this situation additional friction disks and drive plates are removed to accommodate the increased thickness of the expanding friction disk while maintaining the same relative overall clutch pack height. Maintaining approximately the same overall clutch pack height is important in not disrupting the function of the clutch lever activated engagement/disengagement mechanism. With the additional friction disks and drive plates removed, the user is required to increase the compressive force transmitted through the pressure plate in order to maintain the same torque capacity as the original clutch included in the vehicle to counter-act the loss of friction surfaces. Increasing the compressive force transmitted through the pressure plate results in additional clutch lever pull force for the user which is undesirable as it makes the clutch lever more difficult to use when controlling the power delivery of the engine to the drive train. This clutch pack, with reduced surfaces, is also prone to overheating and slip which is undesirable.

Therefore a need exists for an expanding friction disk which is compatible with improved frictions disks of reduced thickness allowing the number of friction surfaces, clutch pack height and compressive force for the clutch system to be maintained.

It is therefore an object of the present invention to provide an improved expanding friction disk which operates with minimal friction and minimal difference between static and dynamic friction, has increased useful life by minimizing wear between centrifugal weights and the first plate and second plate, and which can be configured to operate with improved friction disks which utilize a wear liner to protect the clutch input.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

The disclosed technology is an expanding clutch disk. This clutch disk is designed to work in a clutch, such as those that are used in motorcycles. This type of clutch has a clutch basket with fingers and slots between the fingers, with the clutch basket typically made of aluminum in order to reduce weight. The clutch basket is loaded with friction disks that are either operatively attached to the clutch basket, or which are operably attached to the center clutch. The clutch basket is operatively attached to the motorcycle motor. The center clutch is operatively attached to the motorcycle transmission, and eventually to the wheel. The disclosed technology is an expanding disk which is placed among the friction disks in the clutch basket in order to change the thickness of the expanding disk based on RPMs. Under higher RPMs, certain curved pieces, called centrifugal actuating members, press towards the periphery of the expanding disk. The movement of these members pushes the first and second plate apart. This expansion is resisted by springs holding two disks together. The expansion is caused by cylindrical pins which force the plates apart as the centrifugal actuating members are pressed toward the periphery.

The disclosed expanding friction disk is made up of a generally planar and circular first plate and second plate. Both of these plates have inner and outer surfaces, with a number of centrifugal actuating members adjacent to the inner surface of each of the plates. At least one of these plates, such as the first plate, has at least one ramp, which is a blind slot defined in the inner surface of the first plate. The ramp has a ramped bottom surface, with the slot being deepest toward the center of the circular first plate, and less deep toward the periphery of the circular first plate. The slot is oriented transverse to a radial line from the center of the first circular plate. Corresponding to the slots in the plates, the centrifugal actuating members have pin sockets which surround and trap a cylindrical pin. Under higher RPMs, the centrifugal actuating members are pressed outward toward the periphery of the first plate, and the cylindrical pins in the centrifugal actuating members and in each of the blind slots moves up the ramp bottom in the ramp. As the cylindrical pin approaches the more shallow end of the ramp, the first plate is raised up from contact with the centrifugal actuating members, causing the expanding disk to be thicker.

Optionally, both the first plate and the second plate can each define a number of ramps on their inner surfaces, in which case the centrifugal actuating members would also have a pin socket and a cylindrical pin on each side of the centrifugal actuating members.

Optionally, the ramped bottom slots could be in the centrifugal actuating members, and the pin sockets could be in the first and or second plates.

The first and second plates are attached to each other by a number of springs, each spring biased to pull the plates together. The act of the springs pulling the plates together causes the expanding clutch disk to become thinner under lower RPMs or when stationary.

One or both of the first and second plates can also have a ball ramp for receiving or engaging a ball bearing which is also engaged in a ball socket on the centrifugal actuating members. There is a corresponding ball ramp on the first plate and or the second plate, with a bottom of the ball slot ramped, so as the centrifugal actuating members move outwardly, the ball in the ball ramp assists to raise the plates away from each other while keeping the centrifugal actuating members aligned correctly. The purpose of the balls is to further position in the centrifugal actuating members in the plates and also to assist in separating the first and second plate. The ball sockets on the centrifugal actuating members is a rounded bottom hole, which optionally passes through the centrifugal actuating member so that balls on each side of the centrifugal actuating member touch each other and contribute to each of them rolling together. One or both of the plates can have the balls and ball ramps. The position of the ball ramps and ball sockets can be reversed, with the plates having ball sockets, and the centrifugal actuating members having ball ramps.

Optionally, the ramps defined in the first plate and second plate may have rounded ends which further reduces friction and allows the pins to rotate more freely.

The disclosed technology also includes a clutch assembly having an expanding friction disk. The clutch basket of the assembly is generally cylindrical and has sidewalls and a closed first end and an open second end. The sidewalls of the clutch basket are made up of fingers which are arranged in a generally circular shape, with the fingers separated by slots between the fingers. The disclosed clutch assembly includes a number of U shaped wear liners which are placed in each slot, with the wear liners forming a tight fit with the sidewalls of the fingers and the base of the slot. The wear liners are formed of side pieces joined to a bottom piece. The wear liners are preferably made out of a hard material such as steel, and prevent the friction disk tabs of the friction disk from contacting the softer and lighter metal of the clutch basket. The side pieces of the wear liner have an attached capture flange, which engages the inside surface of each finger.

The disclosed clutch assembly includes a number of friction disks which are of three types. There are driving friction disks which have tabs which functionally connect to the clutch basket. There are driven friction disks which are not functionally connected to the clutch basket but which are functionally connected to the center clutch of the clutch. The third type of friction disk is an expandable disk, of which one or more is included in a stack of multiple friction disks which are housed within the clutch basket. A pressure plate is placed over the open end of the clutch basket and secured with bolts and springs to the center clutch.

Each driving friction disk is made up of a circular and planar disk with a hollow center portion. Each driving friction disk has a number of positioning tabs which extend out from the periphery of each driving friction disk and with the positioning tab engage with the wear liners which are placed in the slots of the clutch basket.

Interleaved among the driving friction disks are a number of driven friction disks. These do not have a positioning tab which extends outward into the slot area, but they have engagement tabs which extend toward the center of the clutch basket and which engage the center clutch. The driven friction disks are configured for frictional engagement with an adjacent driving friction disk.

The third type of friction disk in the disclosed clutch assembly is an expandable disk which is placed somewhere in the stack of friction disks inside the clutch basket. The expandable friction disk is of a type as described above, and has a first plate and a second plate, centrifugal actuating members, cylindrical pins, and optionally balls. This first plate and second plate are pressed together by spring tension, with the plates having a number of such springs holding them together. The centrifugal actuating members press outward under centrifugal force as the clutch basket spins, and the cylindrical pins provide rolling engagement and a force to press the first and second plate apart, when under sufficiently high centrifugal force. Under lower or no centrifugal force, then the centrifugal actuating members move toward the center point of the expanding friction disk, the cylindrical pins move into the deeper portion of the ramps, and the thickness of the expandable friction disk is decreased.

As noted in the description above, at least one of the first plate or the second plate has ramps with a sloping or ramped bottom. In one embodiment both the first plate and second plate have ramps with the ramped bottom. In that embodiment, the centrifugal actuating members have an elongated slot called a pin socket on each side to receive a cylindrical pin. In one possible embodiment of the invention, the centrifugal actuating members have ramps, and the first and second plates have pin sockets.

As noted in the description above, at least one of the first plate or the second plate has ramps with a sloping or ramped bottom. In one embodiment both the first plate and second plate have ramps with the ramped bottom. In that embodiment, the centrifugal actuating members have an elongated slot called a pin socket on each side to receive a cylindrical pin. The pin sockets on each side of the centrifugal actuating members being connected by a through slot allowing for the pins in each pin socket to contact and enable the pins to roll against each other.

The disclosed technology is also a method of modifying an existing motorcycle clutch with improved components for increased power, efficiency, heat dissipation and wear characteristics. The steps of this method start with disassembling an existing clutch. The clutch referred to is the type exemplified by a motorcycle clutch which has a clutch basket which is operationally attached to the motorcycle engine. The clutch basket is made up of fingers with slots between the fingers. The clutch basket has an enclosed first end, an open second end, a center clutch, a pressure plate, and friction plates that are placed inside the clutch basket.

The next step involves placing U shaped wear liners in the slots between the fingers in the clutch basket. The U shaped wear liners have two side pieces which are joined to a bottom piece, forming the U shape. There is a capture flange on each of the side pieces, which is configured to go inside the inside surface of the fingers of the clutch basket. The capture flanges keep the wear liners from flying out of the clutch basket when the clutch basket is spinning.

The next step is placing friction plates of three different types into the clutch basket. Some of these friction plates are driving, meaning that they have protruding tabs which fit between the fingers of the clutch basket. As the clutch basket turns, the driving friction plates also turn, and the edges of the protruding tabs engage the U shaped wear liners. This allows steel driving plates to be utilized, in a manner so that the edges of the steel protruding tabs do not wear on the inside edges of the fingers, which would typically be aluminum. The wear liners would typically be steel and would protect the inside of the fingers from wear from the projecting tabs. Interleaved with the driving friction plates are a number of driven friction plates. These connect with the driving friction plates by friction, and when pressure from the pressure plate is reduced, then the driven plates are disengaged from the driving plates. Driven plates have inward facing tabs which connect with a center clutch, with the center clutch being connected to a transmission and eventually to the wheel of a motorcycle.

The next step is placing a third type of friction plate in the stack of friction plates, and that is an expanding friction disk. This friction disk expands because of a result of centrifugal force, it is operatively connected to the clutch basket with protruding tabs that interface in the U shaped wear liners.

Each of the friction disks thus placed in the clutch basket are made up of a circular and planar disk which has a hollow center portion. The driving plates have a number of positioning tabs extending out from the periphery of each driving friction disk.

The friction disks which are mounted in the clutch basket are also made up of a circular and planar disk with a hollow center portion. The driven disks have a number of engagement tabs which extend toward the center of the disk engagement with ribs the center clutch, with the center clutch configured to rotate in relation to the clutch basket. The center clutch is operatively connected to the transmission and wheel, and the clutch basket is connected to the motor, and the two can be disengaged by a pressure plate, or engaged by pressure being placed on the friction plates to press them together.

The expandable disk is interleaved in the other friction disks and is configured to become thicker when it is subjected to centrifugal force, and it becomes thinner when the centrifugal force is reduced. The next step is attaching the pressure plate over the open second end of the clutch basket and securing with bolts and springs to the center clutch.

The expandable disk placed in the clutch basket is made up of a generally planar and circular first plate with an inner and outer surface, with the first plate inner surface defining at least one generally rectangular ramp. The ramp is a blind slot with a ramped floor, with the floor of the ramp being deepest toward the center of the first plate and less deep toward the periphery of the first plate. The slot is arranged transverse to a radial line from center to periphery of the first plate.

The expanding disk of this method has a number of centrifugal actuating members which are placed adjacent to the inner surface of the first plate. The actuating members have a first side and a second side and at least one of those sides defines a pin socket for receiving a cylindrical pin in each centrifugal actuating member. The cylindrical pin trapped in the pin socket in the centrifugal actuating members is free to rotate within that socket, and the cylindrical pin engages a ramp in the first plate.

The expanding disk using this method also includes a generally planar and circular second plate with an inner and outer surface with an inner surface facing the centrifugal actuating members.

In one embodiment of the device, both sides of the centrifugal actuating members have pin sockets and cylindrical pins, and the second plate as well as the first plate have ramps which engage the cylindrical pins. The first and second plates of the expanding disk used in this method are connected to each other by a number of springs pulling the plates together. Centrifugal actuating members are configured to move outwardly from the center of the disk by centrifugal force in a radial direction toward the periphery of the first and second plates. As the centrifugal actuating members move outwardly from the center of the first and second plates, the cylindrical pins roll up the ramp bottom of the ramps and press the two plates apart. When centrifugal force decreases, the springs push the cylindrical pins down the ramp, and press the first and second plates more closely together.

In one embodiment of the device, both sides of the centrifugal actuating members have pin sockets and cylindrical pins, and the second plate as well as the first plate have ramps which engage the cylindrical pins. The pin sockets used in this method being connected by a through slot and thus allowing the cylindrical pins to contact. The first and second plates of the expanding disk used in this method are connected to each other by a number of springs pulling the plates together. Centrifugal actuating members are configured to move outwardly from the center of the disk by centrifugal force in a radial direction toward the periphery of the first and second plates. As the centrifugal actuating members move outwardly from the center of the first and second plates, the cylindrical pins roll up the ramp bottom of the ramps and press the two plates apart. When centrifugal force decreases, the springs push the cylindrical pins down the ramp, and press the first and second plates more closely together.

The present invention for the improved expanding friction disk is disclosed in FIGS. 1 through 12.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
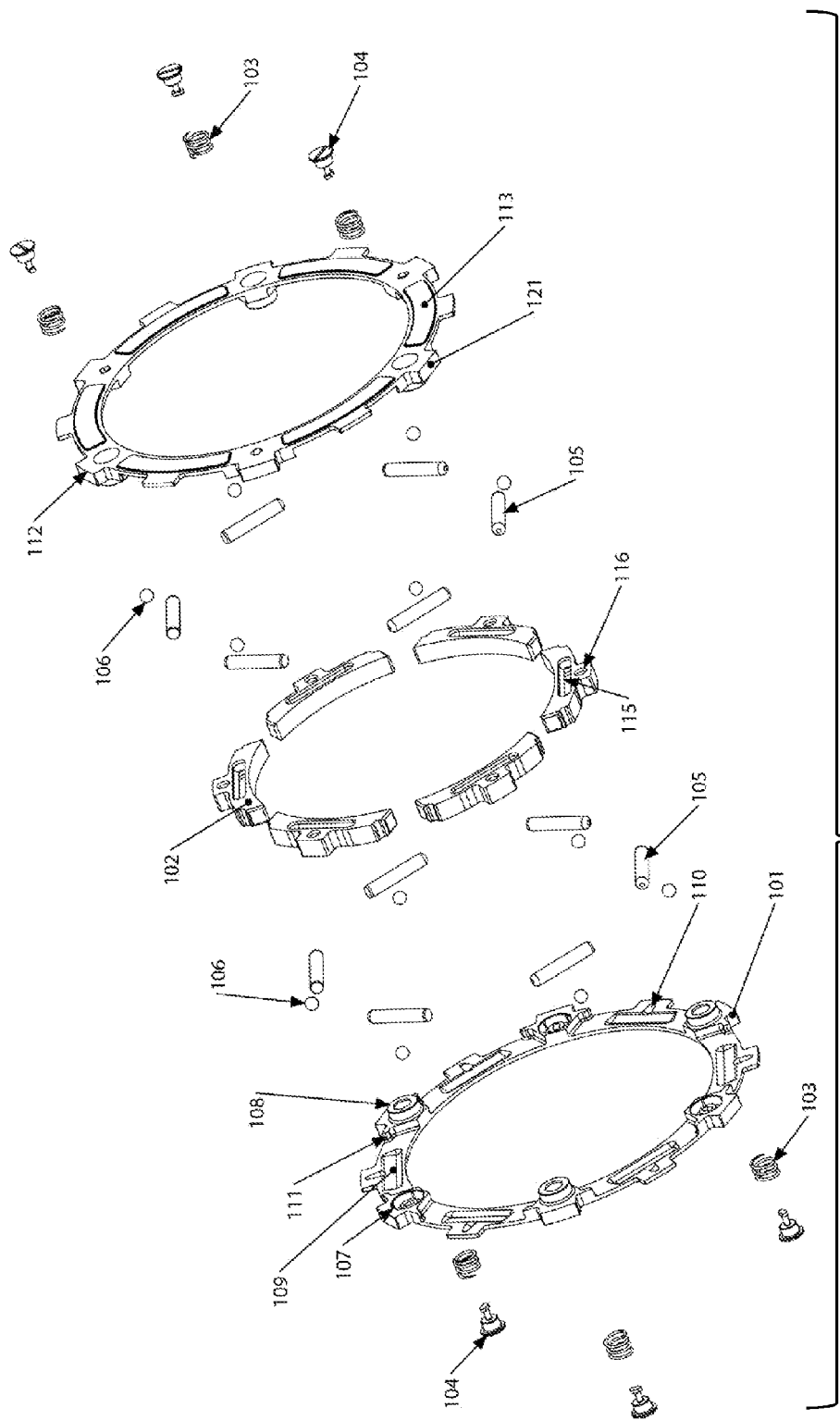
FIG. 1 is an exploded view of a preferred embodiment of an improved expanding friction disk.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Expanding friction disk centrifugal clutch systems are well known in the art and are typified by some of the products produced by Rekluse Motor Sports and include the Core EXP Clutch and EXP Clutch product lines for motorcycles and ATV's produced by Honda, KTM, Yamaha, Kawasaki and Suzuki among others.

An expanding friction disk is most commonly used with a typical clutch system comprised of a clutch input such as a clutch basket, a clutch output such as a center clutch, a pressure plate and one or more disks making up a clutch pack and disposed between the clutch input and clutch output. When the clutch pack is compressed, the clutch input and clutch output become rotationally coupled. Such clutch systems typically include a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system.

An expanding friction disk is configured within the clutch pack like a typical friction disk and contains features coupling it rotationally to the clutch input when the clutch pack is under pressure. The pressure plate typically provides a compressive force via a spring mechanism and is typically biased away from the clutch pack so a gap exists when the expanding friction disk is not expanded. The clutch input is rotated by a motor and changes speed relative to motor speed changes, resulting in the expanding friction disk rotating with the clutch input. Centrifugal weights within the expanding friction disk are actionable causing the expanding friction disk to expand and thus remove the gap between the pressure plate and clutch pack resulting in the clutch pack becoming compressed and pressurized between the center clutch and pressure plate coupling the clutch input and clutch output.

Expanding friction disks are typically comprised by a plurality of centrifugal weights, a first plate, second plate and biasing springs where the biasing springs act on the centrifugal weights either directly or indirectly through features in the first plate and second plate. The centrifugal weights, first plate and second plate contain features and/or components providing at least one contact interface between each centrifugal weight and the first plate and second plate, where the contact interface is either a point, line, surface or rolling contact and can include a combination of contact interface types. Typically, at least the first plate provides a ramped mechanism for its contact interface with the centrifugal weight causing the expanding friction disk to expand when the centrifugal weights move in an outward radial direction. When the expanding friction disk reaches the threshold RPM where the centrifugal weights are able to overcome the biasing springs, the centrifugal weights move in an outward direction under centrifugal force causing the expanding friction disk to expand.

Expanding friction disks are typically much thicker than the standard friction disk they replace within the clutch pack. For example, the clutch system incorporated in a 2011 Honda CRF-450R utilizes a clutch pack incorporating eight friction disks which are approximately 3-millimeters thick and seven drive plates which are approximately 1.6-mm thick resulting in a clutch pack with an overall thickness of approximately 35.2-millimeters. By configuring a clutch pack with improved friction disks which are approximately 1.8-mm thick, and drive plates that are approximately 1.6 mm thick, a clutch pack can be configured using an expanding friction disk, seven improved friction disks and seven drive plates in approximately the same 35.2-millimeter space thus maintaining the equivalent number of friction surfaces in the clutch pack while allowing the user to retain the same compressive force transmitted through the pressure plate resulting in no change to clutch lever effort or to the overall system torque capacity.

Alternatively, utilizing clutch disks of reduced thickness provides the option to significantly increase the torque capacity of the clutch when specialized parts are also used creating maximum room possible for increased clutch disks allowing the user to lower the compressive spring force transmitted through the pressure plate while maintaining approximately the same torque capacity as the original clutch included with the vehicle while reducing burden for the user to active the clutch lever to disengage/engage the clutch system.

The present invention provides for a novel, improved expanding friction disk which operates with minimal friction and minimal difference between static and dynamic coefficients of friction, provides increased useful life by minimizing wear between centrifugal weights and bases sides, and which can be optionally configured to operate with improved friction disks utilizing a wear liner to protect the clutch input. Multiple embodiments are disclosed.

As depicted in FIG. 1 the expanding friction disk 100 is comprised of first plate 101, second plate 121, centrifugal wedges 102, biasing springs 103, fasteners 104, pins 105 and balls 106 where the first plate 101 and second plate 121 are identical. The first plate 101 and second plate 121 contain spring pockets 107, spring cups 108, ramp 109, ball ramp 110, weight stops 111, and external tabs 112. The first plate 101 and second plate 121 include friction pads 113 affixed to one side. The centrifugal wedges 102 contain pin sockets 115 and ball sockets 116. In an alternative embodiment, the first plate 101 and second plate 121 are not identical where only the first plate 101 or second plate 121 contain the ramp 109 and ball ramp 110. In yet another embodiment the first plate 101 and second plate 121 are not identical where the first plate 101 contains spring pockets 107 and the second plate 121 contains spring cups 108 while still allowing for the first plate 101 and second plate 102 to couple together.

Figure 2A:
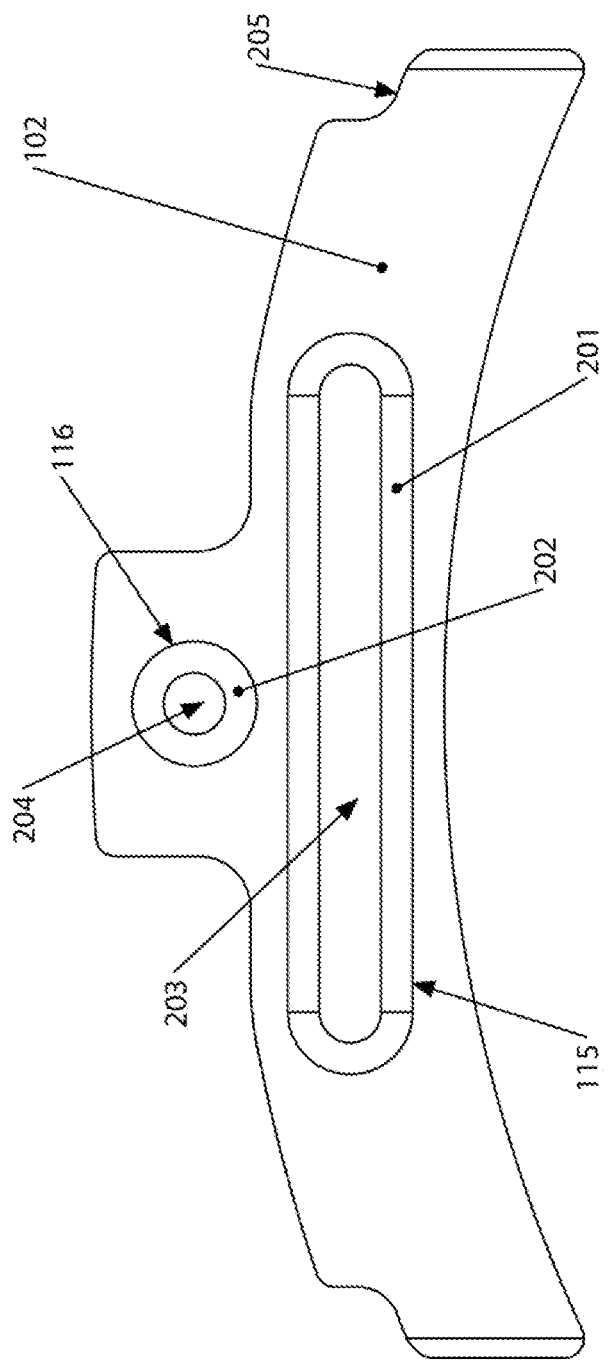
FIG. 2A is a top view of a preferred embodiment of an improved centrifugal weight also referred hereto as a centrifugal wedge.

FIG. 2A discloses a top view of the centrifugal wedge 102. Contained within the centrifugal wedge 102 are pin socket 115, through slot 203, pin slot web 201, ball socket 116, through hole 204 and ball socket web 202. Stop notch 205 is also shown and corresponds to weight stop 111. The centrifugal wedges 102 are shaped substantially like a segment of a typical friction disk profile in order to maximize the volume and therefore the mass and centrifugal effect of the centrifugal wedge 102. In another embodiment the pin socket 115 contains features which support either end of a pin 105 in order to minimize side to side movement of the pin 105 and prevent wear between the ends of the pin 105 and corresponding ends of the pin socket 115.

Figure 2B:
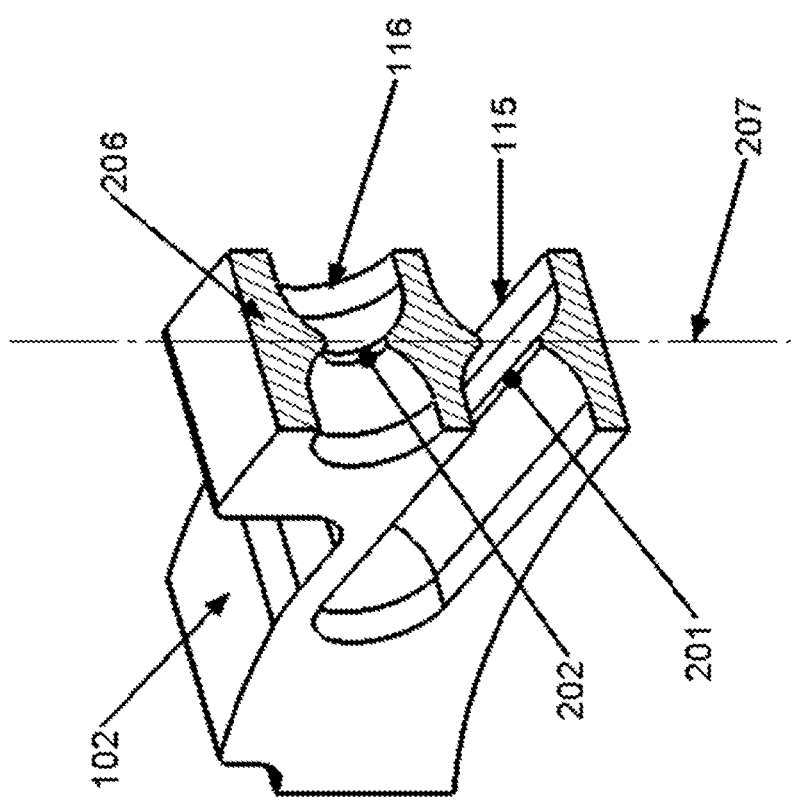
FIG. 2B is an isometric section view of a preferred embodiment of an improved centrifugal weight.

FIG. 2B provides an isometric sectioned view of the centrifugal wedge 102. In this view, the relationship between the pin sockets 115 on either side of the centrifugal wedge 102 and pin slot web 201 can be seen. Similarly, the relationship between the ball sockets 116 in each side of the centrifugal wedge 102 and ball socket web 202 can be seen. The centrifugal wedge 102 is symmetric about a first plane which is coincident to center line 207 and parallel to section-face 206. The centrifugal wedge 102 is also symmetric about a second plane which is coincident to center line 207 and perpendicular to section-face 206.

Figure 3A:
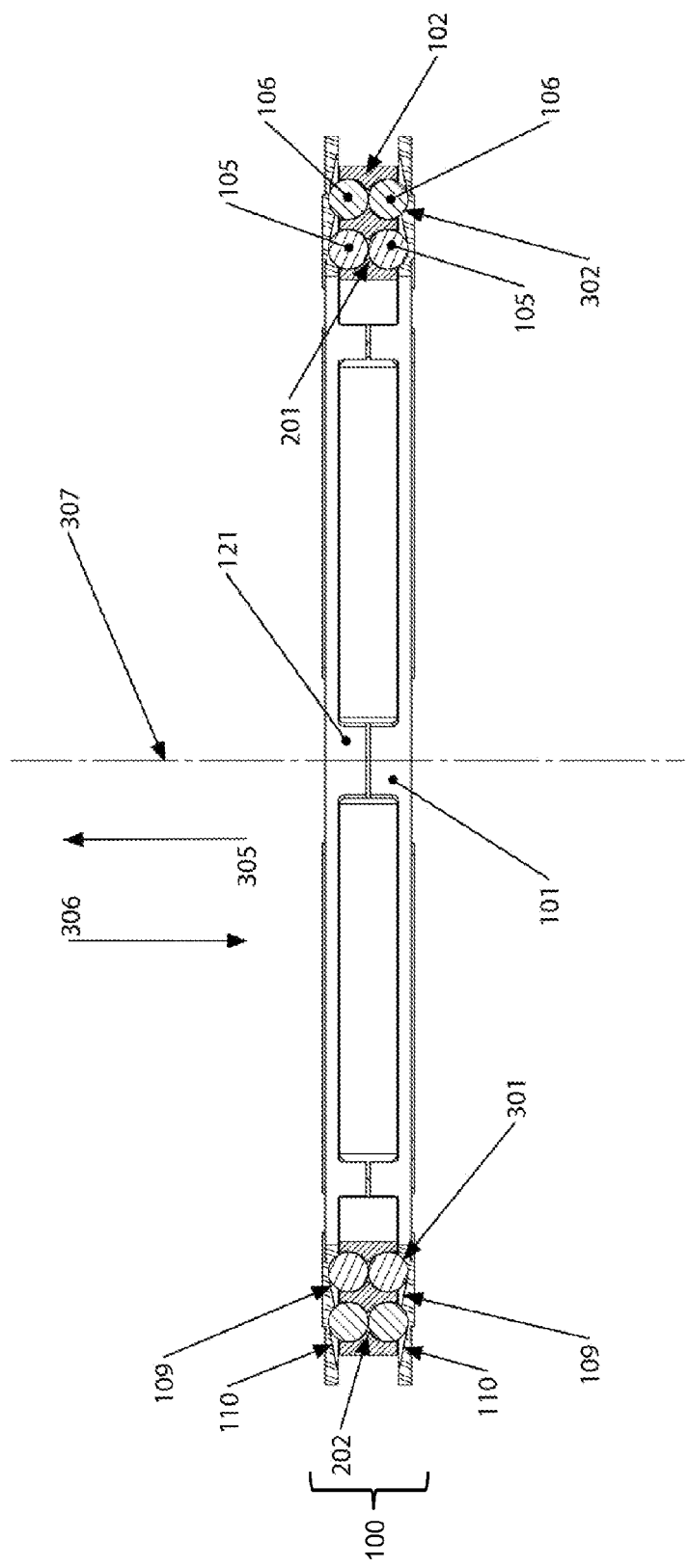
FIGS. 3A, 3B and 4 are section views of a preferred embodiment of an improved expanding friction disk.

FIG. 3A provides a section view of the expanding friction disk 100 sectioned through the center of two centrifugal wedges 102 one-hundred eighty degrees apart bisecting the pins 105 and balls 106. The expanding friction disk 100 is in the collapsed state where the centrifugal wedges are at their respective inner most positions. The pins 105 are shown stacked in sets of two with one set of stacked pins 105 nested within each centrifugal wedge 102 via the opposing pin sockets 115 with the through slot 203 allowing the pins 105 to contact one another. Similarly, the balls 106 are configured in sets of two stacked adjacently with one set of stacked balls 106 contained within each centrifugal wedge 102 via the opposing ball sockets 116 with the through hole 204 allowing the balls 106 to contact one another. Each pin 105 operates against the ramp 109. The ramp 109 being shown as a feature formed into the first plate 101. The ramp 109 contains a back stop 301 to establish the inner position with respect to the axis 307 of the centrifugal wedge 102. The back stop 301 also prevents the centrifugal wedge 102 with pins 105 and balls 106 from dislodging from the expanding friction disk 100 in the inward direction towards the axis 307. Each ball 106 operates against a ball ramp 110. The ball ramp 110 being shown as a feature formed into the first plate 101 and second plate 121. The ball ramp 110 includes a ball ramp back stop 302 which serves similar purposes as the back stop 301. Pin slot web 201 is positioned between the opposing pin sockets 115 formed on both sides of the centrifugal wedge 102. Ball socket web 202 is positioned between the opposing ball sockets 116 formed on both sides of the centrifugal wedge 102. Pin slot web 201 and ball socket web 202 limit the amount of free movement of the centrifugal wedge 102 in the upward direction 305 and downward direction 306 preventing the centrifugal wedge 102 from rocking excessively and interfering with the first plate 101 and second plate 121 as the centrifugal wedge 102 travels outward from center axis 307. When the centrifugal wedges 102 travel outward from center axis 307 the distance the centrifugal wedges 102 can travel is limited by the weight stops 111 of the first plate 101 and second plate 121 because the stop notches 205 will contact the inner wall of the weight stops 111. When the centrifugal wedges 102 travel outward from center axis 307 the first plate 101 and second plate 121 are displaced away from one another as the pins 105 and balls 106 roll along the ramp 109 and ball ramp 110 respectively. In one embodiment the expansion of the expanding friction disk 100 is limited to approximately 0.050-inch. In another embodiment the expansion of the expanding friction disk 100 is limited to 0.080-inch. In yet another embodiment the stacked pairs of pins 105 do not physically contact one another, but rather are in contact with at least one set of two stacked ball bearings which maintains the rolling contact between the pins 105 and respective ramps 109. In yet another embodiment, pin-like features are formed onto the centrifugal wedge 102 providing contact with the ramps 109 similar to the pins 105 where the pin-like features are coated with a friction reducing material providing sliding contact between the pin-like features and respective ramps 109 and where the friction reducing material provides minimal difference between static and dynamic coefficient of friction thus closely matching the performance associated with rolling contact. In yet another embodiment the balls 106 are replaced with rolling elements or pins similar to the pins 105 but of a shorter length.

Figure 3B:
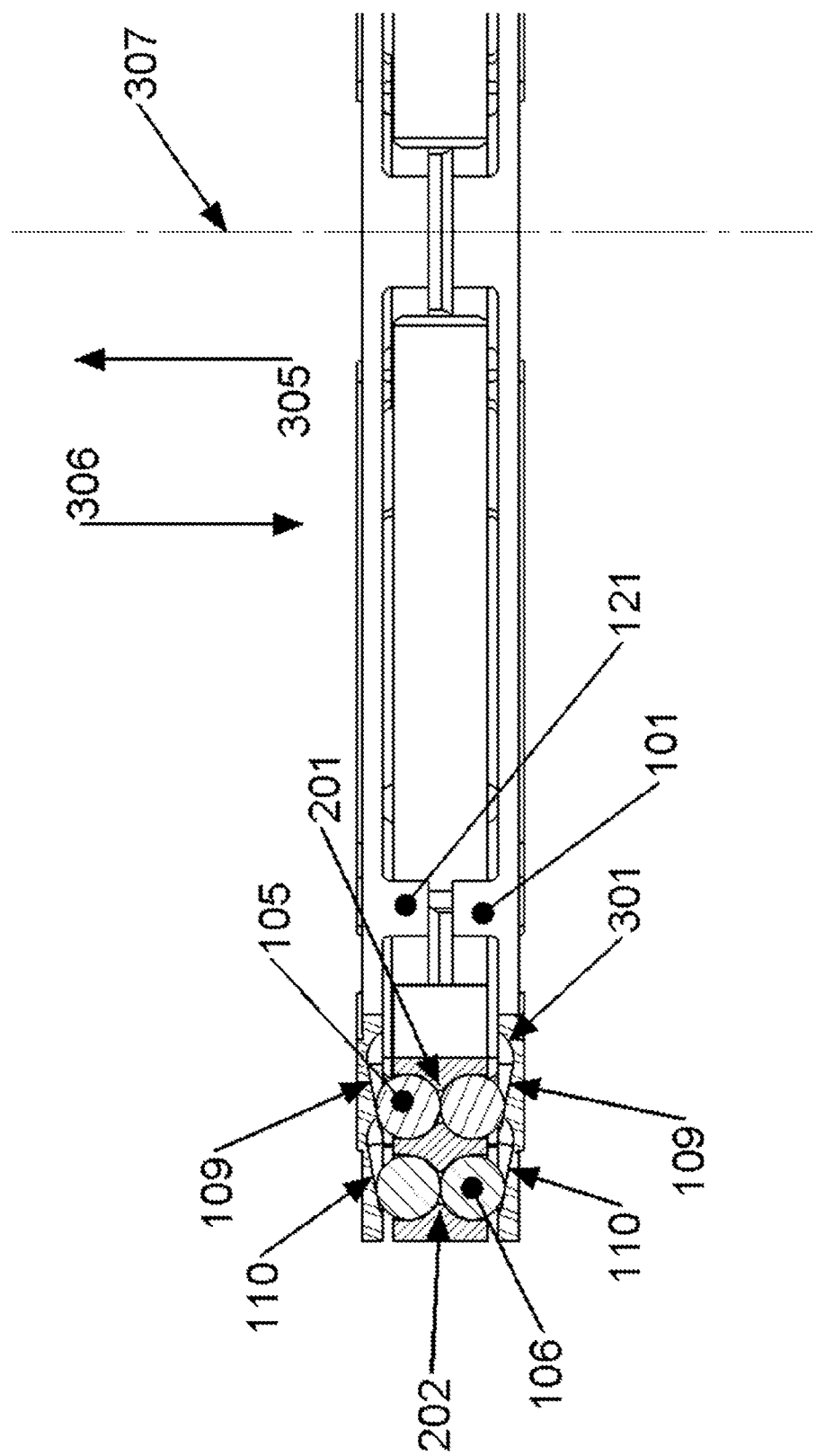

FIG. 3B provides a section view of the expanding friction disk 100 sectioned through the center of one of the centrifugal wedges 102. The centrifugal wedge 102 is shown in its outer most position after centrifugal force as moved the centrifugal wedges 102 out resulting in the expansion of the expanding friction disk 100.

Figure 4:
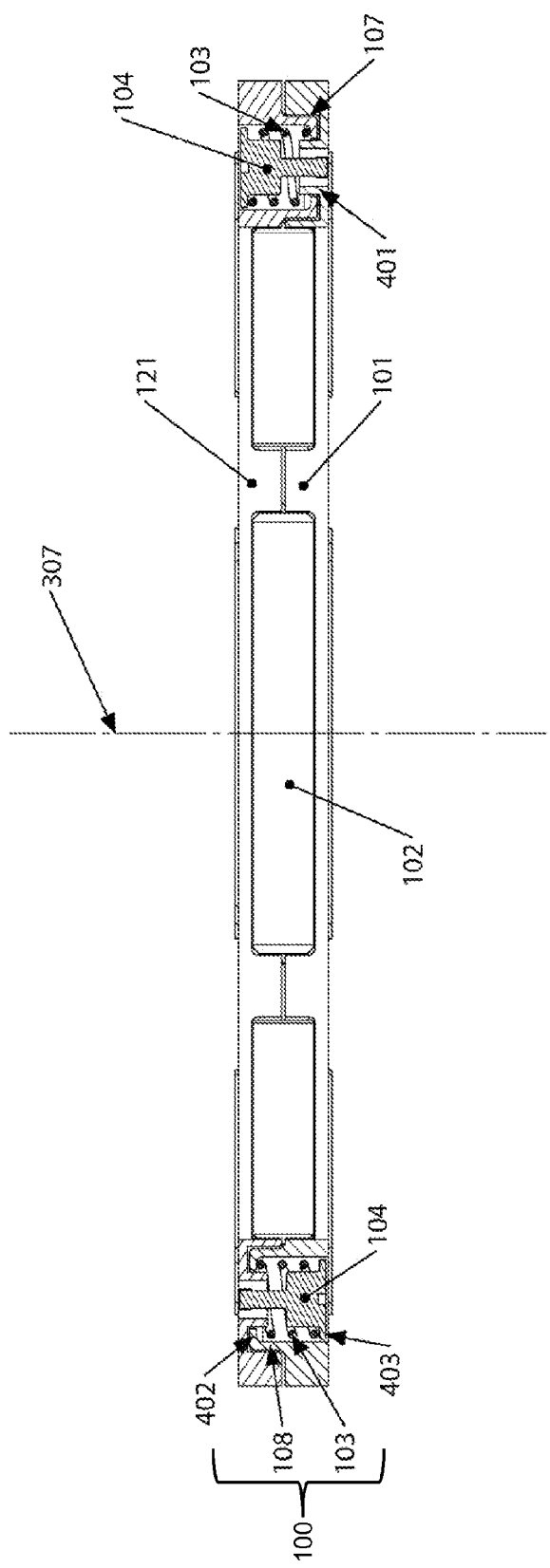

FIG. 4 is a section view of the expanding friction disk 100 sectioned through the center of two fasteners 104 one-hundred eighty degrees apart. The alignment between first plate 101 and second plate 121 is shown where the spring cup 108 indexes into the spring pocket 107. In another embodiment the first plate 101 and second plate 121 do not contain both spring cups and spring pockets and only contain spring cups or spring pockets. The flange 402 of the spring cup 108 supports the biasing spring 103 on one end, while the fastener flange 403 retains the other end of the biasing spring 103. The fastener 104 attaches into the fastener boss 401 shown in the floor of the spring pocket 107 of the first plate 101. In one embodiment the fastener 104 contains features that interlock into corresponding recessed pockets contained by the fastener boss 401 after the fastener is passed through the fastener boss 401 and rotated approximately ninety degrees. In another embodiment the fastener 104 threads into the fastener boss 401. In yet another embodiment the fastener 104 is held in relation to the fastener boss 401 via a retaining ring. When the centrifugal wedges travel in an outward direction away from center axis 307 the first plate 101 and second plate 121 move further apart in relation to one another compressing the engagement spring further.

From FIG. 3A, 3B and FIG. 4 the function of the expanding friction disk 100 is disclosed. The biasing springs 103, through the flange 402 and fastener 104, compel the first plate 101 and second plate 121 together securing the centrifugal wedges 102 with pins 105 and balls 106 within the ramp 109 and ball ramp 110 respectively. As the expanding friction disk is rotated about the center axis 307 centrifugal forces urge the centrifugal wedges 102 in an outward direction away from the center axis 307. When sufficient rotational speed is achieved, the centrifugal force of the centrifugal wedges 102 exceeds the force of the biasing springs 103 and compels the paired sets of pins 105 and paired sets of balls 106, contained within each centrifugal wedges 102, to roll in in contact with the ramp 109 and ball ramp 110 respectively in an outwardly direction away from the center axis 307. As the centrifugal wedges 102 with respective pins 105 and balls 106 advance away from the center axis 307 the first plate 101 and second plate 121 are displaced away from one another along a path parallel to the center axis 307 resulting in the expanding friction disk 100 expanding.

When the centrifugal wedges 102 travel outward from center axis 307 the distance the centrifugal wedges 102 can travel is limited by the weight stops 111 of the first plate 101 and second plate 121 when the stop notches 205 contact the inner wall of the weight stops 111.

Figure 5:
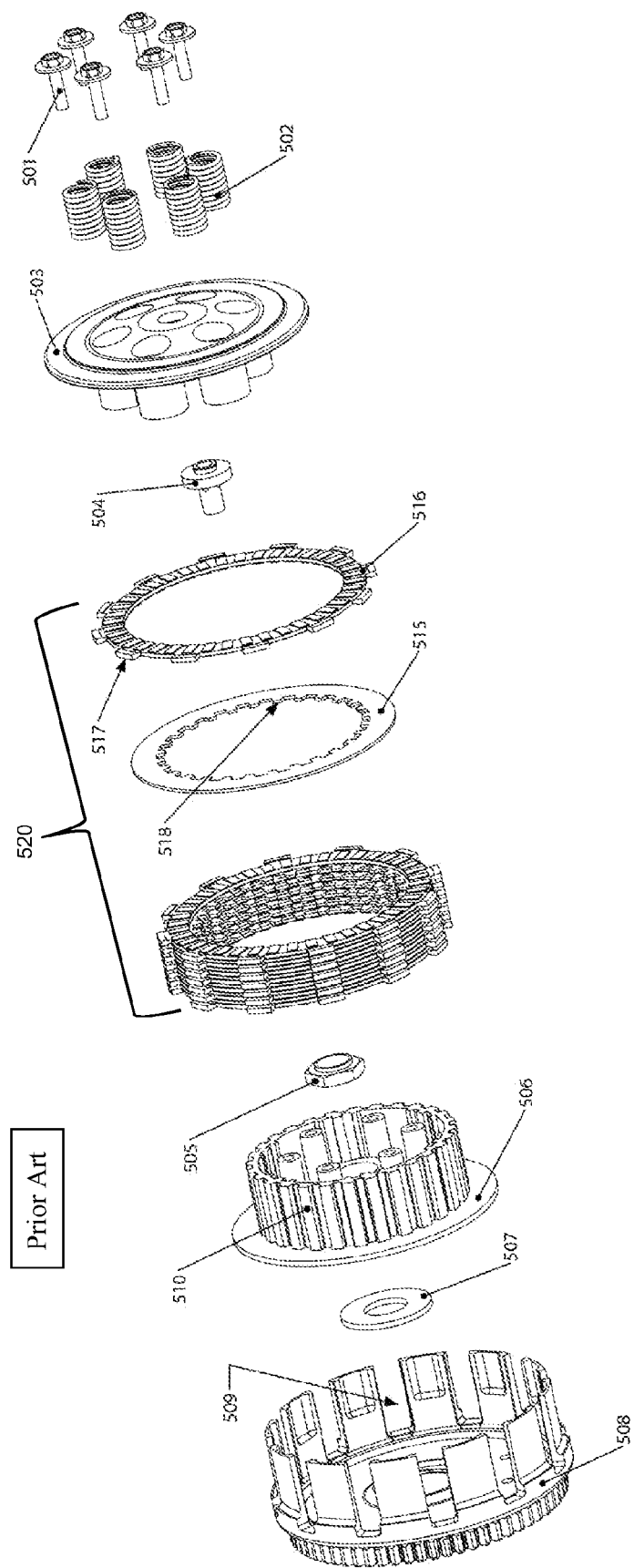
FIG. 5 is an exploded view of a prior art clutch system.

FIG. 5 is an exploded view of a prior art clutch. The configuration of the clutch basket 508, center clutch thrust washer 507, center clutch 506, center clutch nut 505, throw-out 504, friction disk 516, drive plate 515, pressure plate 503, standard springs 502 and spring bolts 501 are typical of most modern motorcycle clutches, this structure is commonly employed in many types of power transmission devices. Clutch pack 520 is comprised of friction disks 516 and drive plates 515. The clutch basket 508 contains slots 509 which receive the friction disk tabs 517 and thus coupling the clutch basket 508 and friction disks 516 rotationally. The center clutch 506 contains a profiled ring 510 which provides rotational coupling to the teeth 518 of the drive plates 515. The clutch basket 508 is typically coupled rotationally to a power input source such as an engine and the center clutch 506 is typically coupled rotationally to an output such as a transmission. In another embodiment the clutch basket 508 is coupled rotationally to an output and the center clutch 506 is coupled rotationally to a power input. Typically the clutch basket 508 contains an opening in the center for receiving a transmission input shaft (not shown); the clutch basket 508 is configured with a bearing between the clutch basket 508 and the transmission input shaft so that the clutch basket 508 can rotate independently of the transmission input shaft with minimal friction. Typically a center clutch thrust washer 507 is disposed between a center clutch 506 and the clutch basket 508. A center clutch nut 505 secures the center clutch 506 against the center clutch thrust washer 507 which in turn is secured against a shoulder (not shown) on the transmission input shaft. The center clutch is typically rotationally coupled to the transmission input shaft via a suitable spline.

Figure 6:
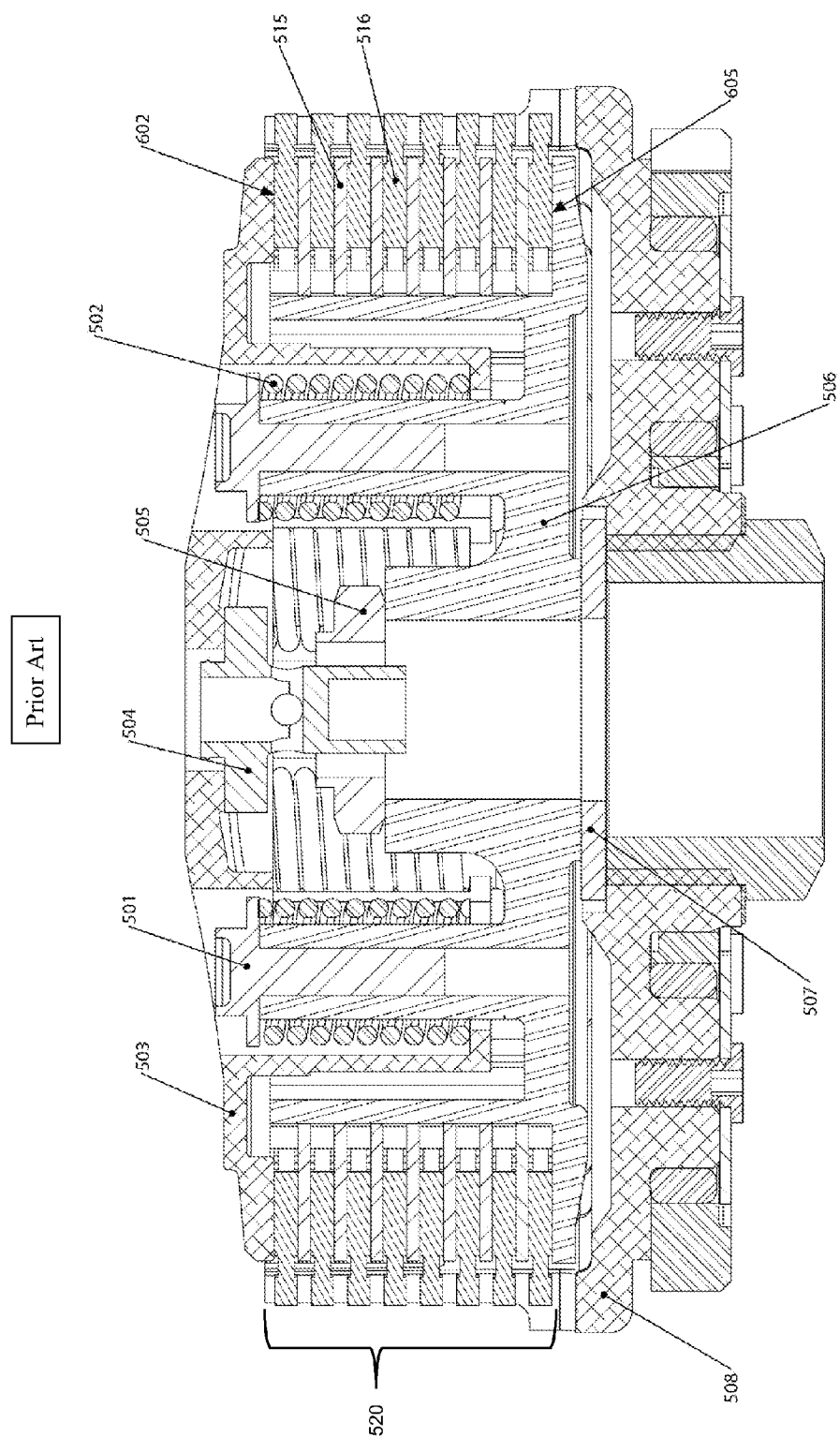
FIG. 6 is a cross-section view of a prior art clutch system.

FIG. 6 is a section view of the prior art clutch shown in FIG. 5. As best seen in FIG. 6, the clutch pack 520 is comprised of eight friction disks 516 and seven drive plates 515. The clutch pack 520 establishes the distance between the pressure plate flange face 602 and center clutch flange face 605. The standard springs 502 act on the pressure plate 503 to compress the clutch pack 520 forcing the adjacent surfaces of the friction disks 516 and drive plates 515 to become coupled rotationally and in turn coupling the basket 508 and center clutch 506 rotationally. The throw-out 504 is coupled to a clutch disengagement system (not shown). The clutch disengagement system (not shown) is operable to selectively position the throw-out 504 for the purpose of pushing the pressure plate 503 away from the clutch pack 520 to disengage the clutch. Alternatively, the clutch disengagement system (not shown) is operable to selectively position the throw-out 504 for the purpose of returning the pressure plate 503 into contact with the clutch pack 520 to engage the clutch. In another embodiment the clutch pack 520 is comprised of nine friction disks 516 and eight drive plates 515. In the preferred embodiment the clutch pack 520 is comprised of eight 3-millimeter thick friction disks 516 and seven 1.6-millimeter drive plates 515 resulting in the clutch pack 520 being approximately 35.2-millimeters tall. In other prior art the clutch pack 520 is less than 35-millimeters tall and is comprised of eight friction disks and seven drive plates that are less than 1.6-millimeters thick. In yet other prior art, the clutch pack 520 is taller than 35.2 millimeters and is comprised of nine friction disks which are approximately 4-millimeters thick and eight drive plates which are approximately 2-millimeters thick.

Figure 7:
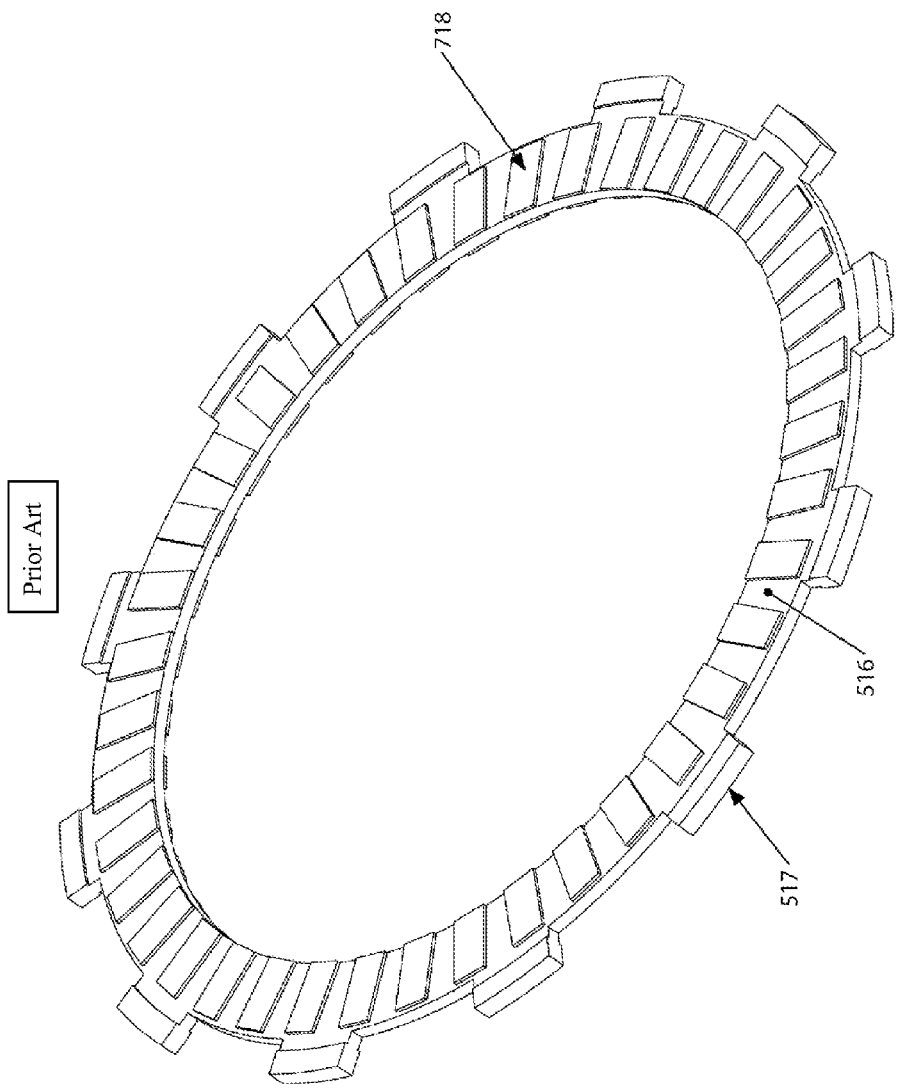
FIG. 7 is an isometric view of a prior art friction disk.

FIG. 7 is an isometric view of a prior art friction disk 516 utilized in the prior art clutch. FIG. 7 shows rectangular pads 718 affixed to the friction disk 516. The rectangular pads 718 are affixed to both sides of the friction disk 516. The rectangular pads 718 are typically a composite material where the material has frictional properties suited for engaging adjacent surfaces of drive plates 515 with which the friction disks 516 contact. In another embodiment, the friction disk 516 utilizes forty-eight rectangular pads 718 per side. In another embodiment twenty-four rectangular pads 718 per side are used. In yet another embodiment the rectangular pads 718 are wider and therefore approach a more square shape.

Figure 8:
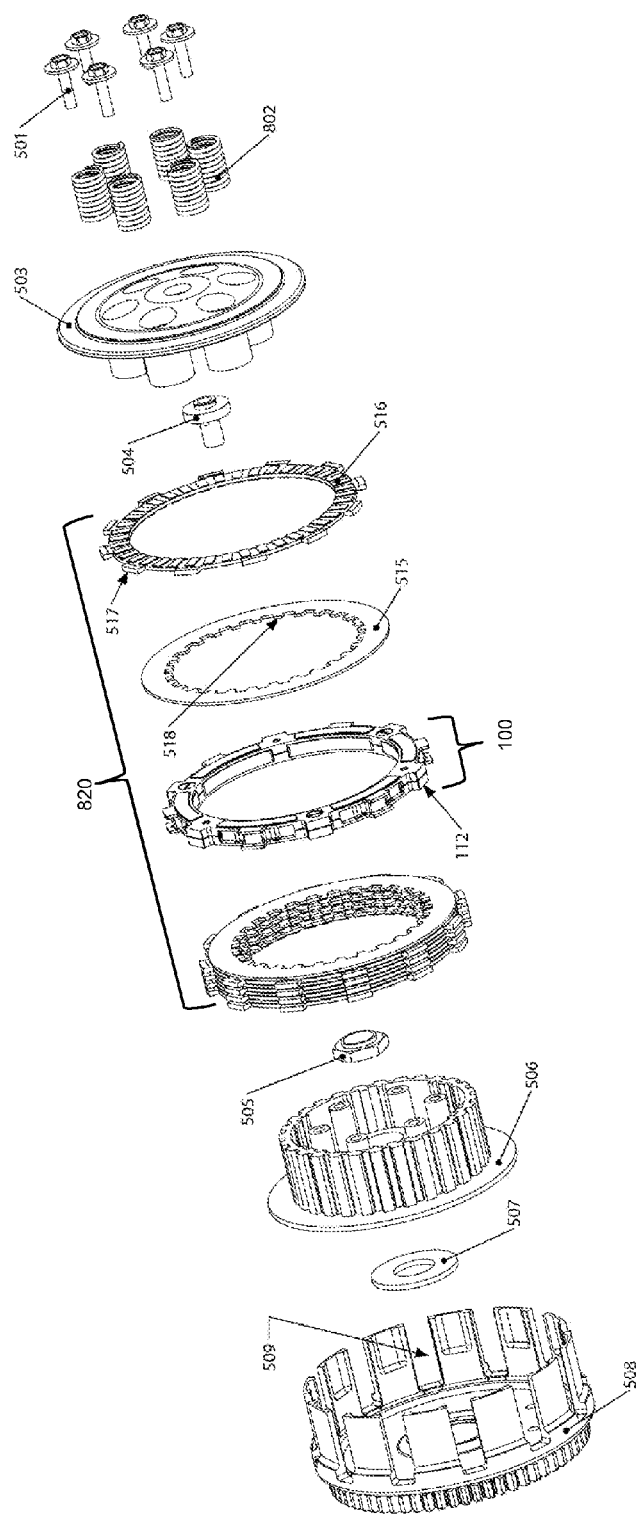
FIG. 8 is an exploded view of a preferred embodiment of an improved expanding friction disk configured within a clutch pack utilizing prior art friction disks.

FIG. 8 is an exploded view of the prior art clutch shown in FIG. 5 utilizing a revised clutch pack 820 which includes the expanding friction disk 100, friction disks 516 and drive plates 515. The basket contains slots 509 which receive the friction disk tabs 517 and external tabs 112 of the expanding friction disk 100. The expanding friction disk 100 profile is designed to match that of a friction disk 516 thus providing similar rotational coupling to the basket 508. In another embodiment where the center clutch 506 is coupled rotationally to a power input and the basket 508 is coupled rotationally to a power output the expanding friction disk 100 profile is designed to match that of a drive plate 515 in order to provide rotational coupling to the center clutch 506. Stronger springs 802 are also shown and provide increased force as compared to the standard springs 502 used in the prior art clutch shown in FIG. 5. The stronger springs 802 are required to compensate for fewer friction surfaces within the revised clutch pack 820 as compared with the clutch pack 520 for the purpose of maintaining the overall torque capacity of the clutch system when clutch pack 820 is used in place of clutch pack 520.

Figure 9:
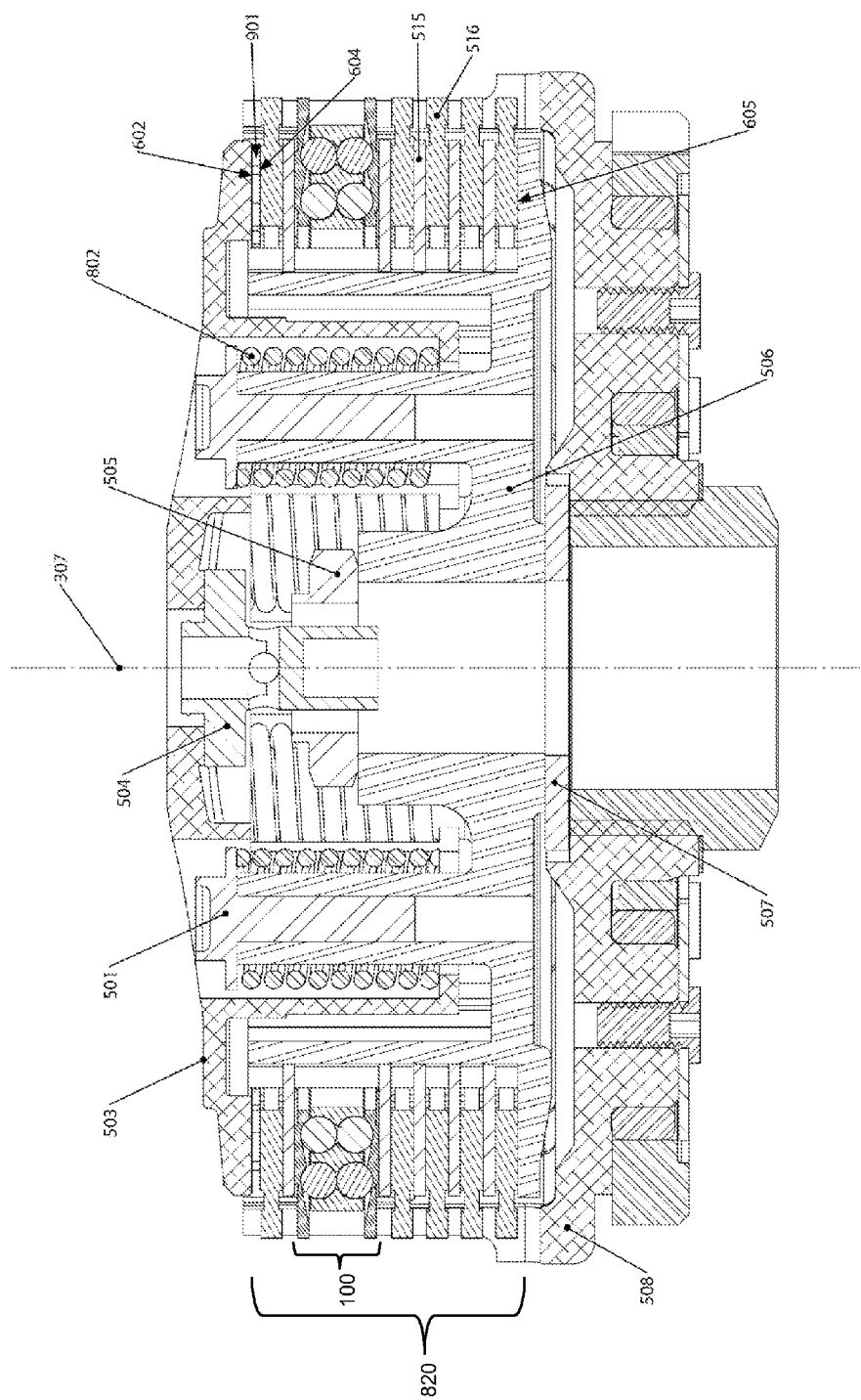
FIG. 9 is a section view of a preferred embodiment of an improved expanding friction disk configured within a clutch pack utilizing prior art friction disks.

FIG. 9 is a section view of the prior art clutch utilizing the revised clutch pack 820 including the expanding friction disk 100 shown in FIG. 8. As best seen in FIG. 9 the clutch pack 820 is comprised of five friction disks 516, five drive plates 515 and the expanding friction disk 100. A gap 901 exists between the pressure plate flange face 602 of the pressure plate 503 and friction face 604 of the friction disk 516. Creating the gap 901 is typically done via an external adjuster acting on the clutch disengagement system and thus on the throw-out 504 to bias the pressure plate 503 in a direction away from the clutch pack 820. Other methods for biasing the pressure plate 503 to create a gap 901 exist in the prior art and any method can be employed. When the centrifugal wedges 102 travel outward from center axis 307 they displace the first plate 101 and second plate 121 eliminating the gap 901 and thus engaging the pressure plate 503 and standard springs 502 pressurizing the clutch pack 520 and thus coupling the basket 508 and center clutch 506 and thus the clutch input to the clutch output. Maintaining approximately the same distance between the pressure plate flange face 602 and center clutch flange face 605 is important as to not disrupt the spacing and function for the clutch disengagement system (not shown) coupled to the throw-out 504. Significantly changing the spacing between the pressure plate flange face 602 and center clutch flange face 605 can hinder the function of the clutch disengagement system (not shown) and/or the user's ability to operate the clutch disengagement system.

Figure 10:
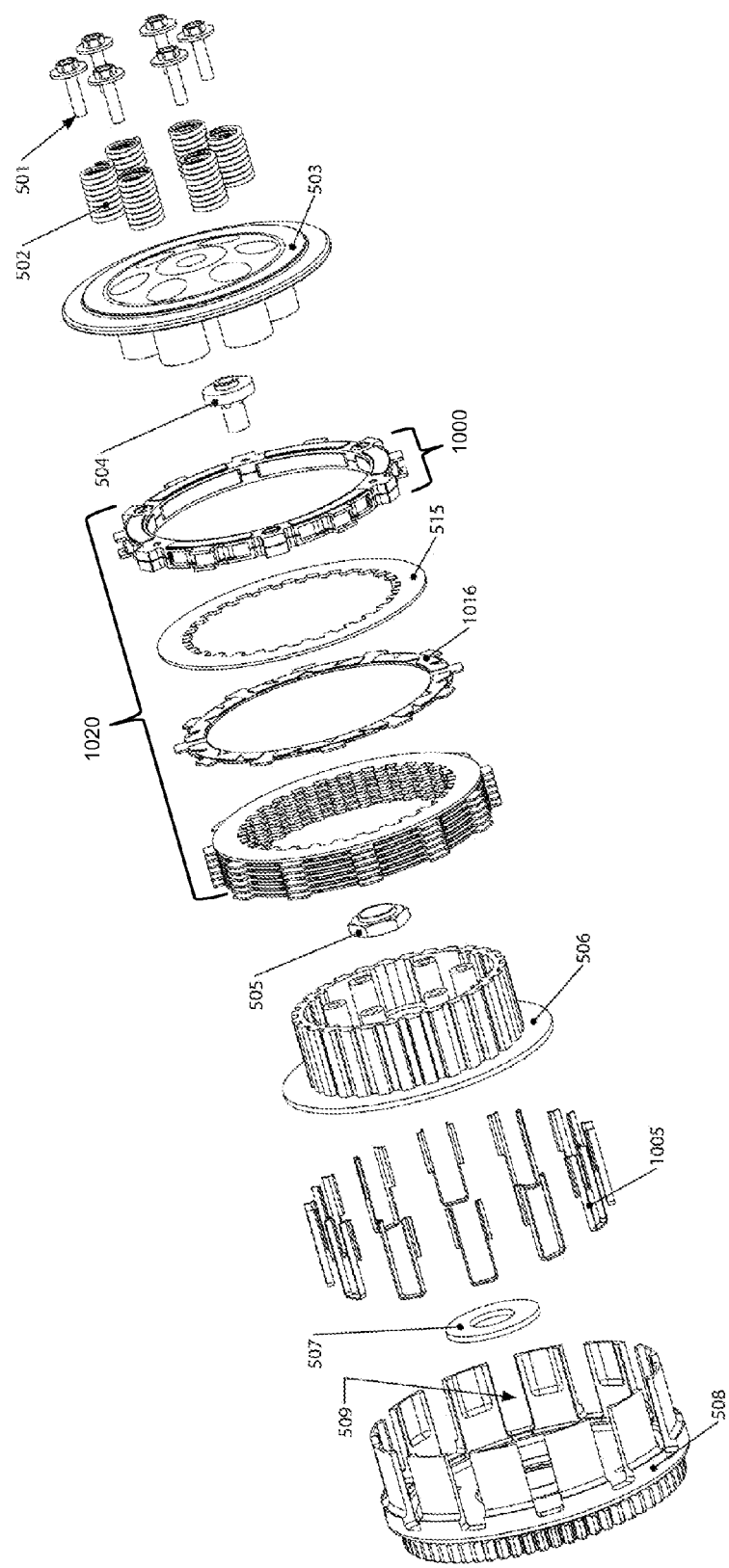
FIG. 10 is an exploded view of a preferred embodiment of an improved expanding friction disk configured within a clutch pack utilizing improved friction disks.

FIG. 10 is an exploded view of the prior art clutch shown in FIG. 5, utilizing an improved clutch pack 1020 comprised of an adapted expanding friction disk 1000, improved friction disks 1016 and drive plates 515. The basket 508 contains slots 509 which receive the wear liners 1005 therefore rotationally coupling the clutch pack 1020 to the basket 508 via the wear liners 1005. Standard springs 502 are also shown being used with the improved clutch pack 1020. The improved clutch pack 1020 allows the use of the standard springs 502 because the improved clutch pack 1020 retains the same number of friction surfaces as the clutch pack 520 and thus torque capacity of the clutch system is maintained. Furthermore, since the improved clutch pack 1020 allows the use of the standard springs 502, the effort required to operate the clutch disengagement system is unchanged offering a significant advantage for the user compared to the clutch pack 820.

Figure 11:
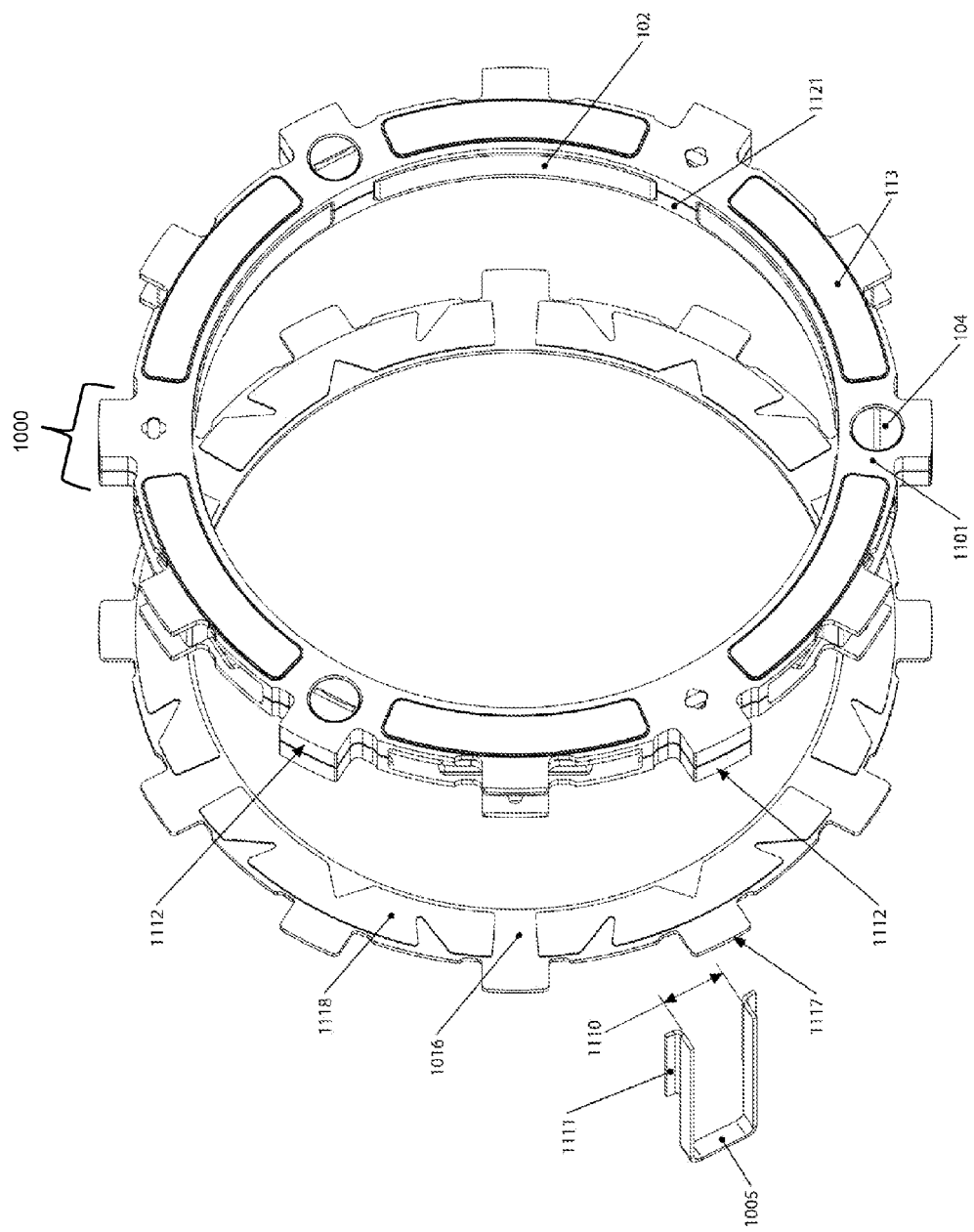
FIG. 11 is an isometric view of a preferred embodiment of an improved expanding friction disk, improved friction disk and wear liner.

FIG. 11 is an isometric view of an improved friction disk 1016, a wear liner 1005 and adapted expanding friction disk 1000. The modified first plate 1101 and modified second plate 1121 of the adapted expanding friction disk 1000 are designed to match the profile of the improved friction disk 1016. The disk tabs 1117 of the improved friction disk 1016 and the modified external tabs 1112 of the modified first plate 1101 and modified second plate 1121 are sized appropriately to fit within the liner opening 1110 of the wear liners 1005. The wear liner 1005 consists of a U-shaped profile with liner opening 1110 and ID capture flange 1111. The ID capture flange 1111 prevents the wear liner 1005 from separating from the basket 508 due to centrifugal forces acting on the liner 1005 when the basket 508 is rotating. In an alternative embodiment, the modified first plate 1101 and modified second plate 1121 are not identical where only the modified first plate 1101, or modified second plate 1121 contain the ramp 109 and ball ramp 110. In yet another embodiment the modified first plate 1101 and modified second plate 1121 are not identical where the modified first plate 1101 contains spring pockets 107 and the modified second plate 1121 contains spring cups 108 while still allowing for the modified first plate 1101 and modified second plate 1121 to couple together.

In FIG. 11 the adapted expanding friction disk 1000 is shown configured with the centrifugal wedges 102, fasteners 104 and friction pads 113 showing that the adapted expanding friction disk 1000 is comprised of the same components as the expanding friction disk 100 with the exception of the modified first plate 1101 and modified second plate 1121 which are adapted to function with the wear liner 1005 such that the modified external tabs 1112 are appropriately sized to fit within the liner opening 1110.

Also shown in FIG. 11, the improved friction disk 1016 is comprised of disk tabs 1117 and friction segments 1118 where the disk tabs 1117 are appropriately sized to fit within the liner opening 1110. Furthermore, the friction segments 1118 are designed to minimize parasitic drag when pressure is removed from the improved clutch pack 1020. Parasitic drag exists whenever the surfaces in contact between improved friction disks 1016 and drive plates 515 decouple but remain in close proximity to one another allowing surface tension in cooling fluid such as oil to cause parasitic drag and/or incidental contact to cause parasitic drag. The design of the friction segments 1118 and their respective arrangement on both sides of the improved friction disk 1016 allow the improved friction disks 1016 to rotate independently of the drive plates 515 with an acceptable amount of parasitic drag. Optimizing the shape and features of the friction segments 1118 with respect to reducing parasitic clutch drag is important in allowing the improved friction disks 1016 to decouple from the drive plates 515 when the adapted expanding friction disk 1000 is collapsed and providing the gap 901. In other embodiments where more than seven improved friction disks 1016 are configured with interleaved drive plates 515, the friction segment 1118 design maintains approximately the same amount of parasitic drag as the clutch pack 1020. In these embodiments the advantage of configuring the clutch to accommodate more than seven improved friction disks 1016 further enhances performance aspects of the clutch. One option made possible if more than seven improved friction disks 1016 are used is for the user to utilize lighter springs providing less force than the standard springs 502 in order to reduce effort in operating the clutch disengagement system (not shown), but while maintaining similar torque capacity to typical clutch pack utilizing eight friction disks 516.

Figure 12:
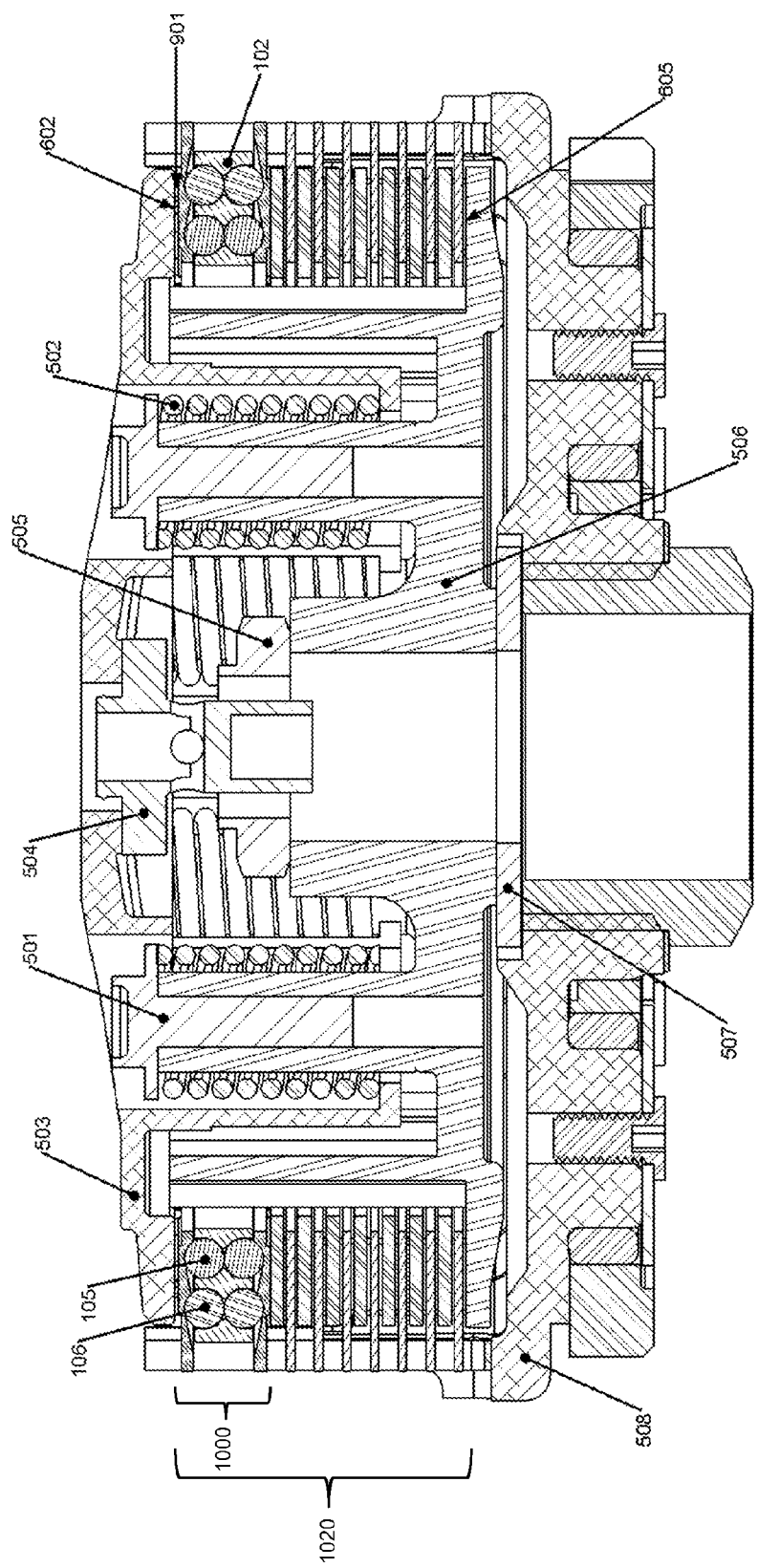
FIG. 12 is a section view of a preferred embodiment of an improved expanding friction disk configured within a clutch pack utilizing improved friction disks.

FIG. 12 is a section view of the prior art clutch utilizing the adapted expanding friction disk 1000 and improved clutch pack 1020 shown in FIG. 10. As best seen in FIG. 12 the clutch pack 1020 is comprised of seven improved friction disks 1016, seven drive plates 515 and the adapted expanding friction disk 1000. The gap 901 exists between the pressure plate flange face 602 of the pressure plate 503 and the top face 1204 of the modified expanding friction disk 1000. The improved clutch pack 1020 along with gap 901 maintain approximately the same distance between the pressure plate flange face 602 and center clutch flange face 605 in order to not disrupt the spacing and function of the clutch disengagement system (not shown) coupled to the throw-out 504. Significantly changing the spacing between the pressure plate flange face 602 and center clutch flange face 605 can hinder the function of the clutch disengagement system (not shown) and/or the user's ability to operate the clutch disengagement system. The improved clutch pack 1020 provides the equivalent number of surfaces as the clutch pack 520 and therefore maintains the same torque capacity using the standard springs 502. Providing an improved clutch pack 1020 with the adapted expanding friction disk 1000 provides many performance advantages including, lower operating temperatures, use of the standard clutch springs which provide no change in effort for operating the clutch disengagement system (not shown). In an alternative embodiment the clutch pack 1020 is configured with the adapted expanding friction disk 1000 located in the middle of the clutch pack 1020. In yet another embodiment the clutch pack 1020 is configured with the adapted expanding friction disk 1000 located at the bottom, or near the bottom of the clutch pack 1020.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. An expanding clutch disk for use in a clutch of the type having a clutch basket with fingers and slots, and driven and driving plates, said expanding friction disk comprising:
   a generally planar and circular first plate with an inner and an outer surface, with said first plate inner surface defining at least one generally rectangular ramp, said ramp having a ramped bottom surface, with said ramp being deepest toward the center of the circular first plate, and less deep toward the periphery of said circular first plate, with said ramp oriented transverse to a radial line from the center of said circular first plate;
   a plurality of centrifugal actuating members adjacent to said first plate, with said actuating members having a first side and a second side, with said first side defining one or more pin sockets configured for receiving a cylindrical pin in each centrifugal actuating member; and
   a generally planar and circular second plate with an inner and an outer surface, with said second plate inner surface facing said plurality of centrifugal actuating members;
   with said first and second plates attached to each other by a plurality of springs, and with said plurality of centrifugal actuating members configured to move by centrifugal force in a radial direction toward the periphery of said first and second plates, with said plurality of springs urging said plates closer to each other by pressing said cylindrical pin into send deeper region of said slot, and with said plates configured to move apart due to centrifugal force pressing said centrifugal actuating members toward a periphery of said plates and thus causing said cylindrical pins to move into a less deep portion of said slot, and forcing said plates apart, with said plates and centrifugal actuating members moving over each other by rolling engagement of said cylindrical pins captured between said ramps and said pin sockets.

2. The expanding clutch disk of claim 1 which further comprises at least one ramp defined in said inner surface of said second plate, and corresponding one or more pin sockets in said second side of said centrifugal actuating member, for expanding said plates away from each other.

3. The expanding clutch disk of claim 1 which further comprises at least one ball socket in said centrifugal actuating member, at least one ball ramp in said first plate, and at least one ball positioned in said ball socket and said ball ramp, with said ramp comprising a radial track with a ramped bottom, with said ball ramp being deeper toward the center of said first plate, and less deep toward said periphery of said first plate.

4. The expanding clutch disk of claim 1 which further comprises at least one ball socket on each side of said centrifugal actuating member, at least one ball ramp in each of said first plate and said second plate, and at least one ball positioned in said ball sockets and said ball ramps, with said ramp comprising a radial track with a ramped bottom, with said ball ramp being deeper toward the center of said first plate, and less deep toward said periphery of said first plate.

5. The expanding clutch dish of claim 4 wherein said at least one ball socket comprises a ball socket on a first side of said centrifugal actuating member, and at least a second ball socket directly opposite said at least one ball socket on said first side of said centrifugal actuating member, with a first ball in said at least one ball socket on said first side of said centrifugal actuating member, and a second ball in said second ball socket, with said ball sockets formed so that said first ball and said second ball on opposite sides of said centrifugal actuating member touch each other.

6. The expanding clutch disk of claim 5 which further comprises a plurality of corresponding ramp and ramp socket pairs, and a plurality of ball ramp and ball socket pairs.

7. The expanding clutch disk of claim 1 in which said centrifugal actuating member is comprised of at least two pin sockets and pins on opposite sides of said centrifugal actuating member with said pin sockets forming a through slot with said cylindrical pins touching and configured to roll against each other.

8. The expanding clutch disk of claim 7 which further comprises at least one ball socket in said centrifugal actuating member, at least one ball ramp in said first plate, and at least one ball positioned in said ball socket and said ball ramp, with said ramp comprising a radial track with a ramped bottom, with said ball ramp being deeper toward the center of said first plate, and less deep toward said periphery of said first plate.

9. The expanding clutch dish of claim 8 which further comprises at least one ball socket on a first side of said centrifugal actuating member, and at least a second ball socket directly opposite said at least one ball socket on said second side of said centrifugal actuating member, with a first ball in said at least one ball socket, and a second ball in said second ball socket, with said ball sockets formed so that said first ball and said second ball on opposite sides of said centrifugal actuating member touch each other.

10. The expanding clutch disk of claim 8 which further comprises a plurality of corresponding ramp and ramp socket pairs, and a plurality of ball ramp and ball socket pairs.

11. An expanding clutch disk for use in a clutch of the type having a clutch basket with fingers and slots, and driven and driving plates, said expanding friction disk comprising:
  a generally planar and circular first plate with an inner and an outer surface, with said first plate inner surface defining at least one generally rectangular ramp, said ramp having a ramped bottom surface, with said ramp being deepest toward the center of the circular first plate, and less deep toward the periphery of said circular first plate, with said ramp oriented transverse to a radial line from the center of said circular first plate, and with said ramp configured to engage a cylindrical pin;
  a plurality of centrifugal actuating members adjacent to said first plate, with said centrifugal actuating members having a first side and a second side, with said first and second sides each defining a plurality of pin sockets configured for receiving a cylindrical pin in each centrifugal actuating member, with said pin sockets forming a through slot with said cylindrical pins touching and configured to roll against each other; and
  a generally planar and circular second plate with an inner and an outer surface, with said second plate inner surface facing said plurality of centrifugal actuating members and defining one or more ramps in said inner surface, with said ramps configured to engage a cylindrical pin in a corresponding pin socket of said centrifugal actuating member;
  with said first and second plates attached to each other by a plurality of springs, and with said plurality of centrifugal actuating members configured to move by centrifugal force in a radial direction toward the periphery of said first and second plates, with said plurality of springs urging said plates closer to each other by pressing said cylindrical pin into said deeper region of said slot, and with said plates configured to move apart due to centrifugal force pressing said centrifugal actuating members toward a periphery of said disks and thus causing said cylindrical pins to move into a less deep portion of said slot, and forcing said plates apart, with said plates and centrifugal actuating members moving over each other by a rolling engagement of one or more pins captured between said ramps and said pin sockets.

12. The expanding clutch disk of claim 11 which further comprises at least one ball socket on each side of said centrifugal actuating member, at least one ball ramp in each of said first plate and said second plate, and at least one ball positioned in said ball sockets and said ball ramps, with said ball ramp comprising a radial track with a ramped bottom, with said ball ramp being deeper toward the center of said first plate, and less deep toward said periphery of said first plate.

13. A clutch assembly for a vehicle, comprising:
  a generally cylindrical clutch basket with sidewalls, a closed first end and an open second end, with said sidewalls made up of fingers and slots between the fingers;
  a plurality of wear liners disposed in each slot, said slot liners lining the sides and bottom edges of said sidewall fingers, to prevent contact between said fingers and a plurality of positioning tabs of a plurality of driving friction disks, and with said wear liners further comprising a capture flange on each side piece of said wear liner;

said plurality of driving friction disks mounted in said clutch basket, each driving friction disk comprising a circular and planar disk with a hollow center portion, with said plurality of positioning tabs extending out from a periphery of each driving friction disks, configured to extend between said fingers, and each driving friction disks configured for frictional engagement with an adjacent driven friction disk;

a plurality of driven friction disks mounted in said clutch basket, each driven friction disk comprising a circular and planar disk with a hollow center portion, with a plurality of engagement tabs extending toward the center of said disks, for engagement with a center clutch which is configured to rotate in relation to said clutch basket, with each driven friction disks configured for frictional engagement with an adjacent driving friction disk;

an expandable friction disk interleaved in said plurality of friction disks, said expandable disk configured to become thicker through rolling contact between a pin, a first and second plate, and at least one centrifugal actuating members, with said centrifugal actuating member configured to move when subjected to a selected amount of centrifugal force and said expandable disk configured to become thinner when said centrifugal force decreases, with said plates and centrifugal actuating members moving over each other by rolling engagement of one or more pins captured between said ramps and said pin sockets; and wherein said expanding clutch disk further comprises at least one ramp defined in an inner surface of said second plate, and corresponding one or more pin sockets in said second side of said centrifugal actuating member, with two pin sockets and pins on opposite sides of said centrifugal actuating member, with said pin sockets forming a through slot with said cylindrical pins touching and configured to roll against each other, for expansion of said plates away from each other.

14. The clutch assembly of claim 13 which further comprises at least one ball socket on each side of said centrifugal actuating member, at least one ball ramp in each of said first plate and said second plate, and at least one ball positioned in said ball sockets and said ball ramps, with said ramp comprising a radial track with a ramped bottom, with said ball ramp being deeper toward the center of said first plate, and less deep toward said periphery of said first plate.

15. The clutch assembly of claim 13 which further comprises at least one ball socket on a first side of said centrifugal actuating member, and at least a second ball socket directly opposite said at least one ball socket on said second side of said centrifugal actuating member, with a first ball in said at least one ball socket, and a second ball in said second ball sockets, with said ball sockets formed so that said first ball and said second ball on opposite sides of said centrifugal actuating member touch each other.

16. A clutch assembly for a vehicle, comprising:

a generally cylindrical clutch basket with sidewalls, a closed first end and an open second end, with said sidewalls made up of fingers and slots between the fingers;

a plurality of wear liners disposed in each slot, said slot liners lining the sides and bottom edges of said sidewall fingers, to prevent contact between said fingers and positioning tabs of a plurality of driving friction disks, and with said wear liners further comprising a capture flange on each side piece of said wear liner;

said plurality of driving friction disks mounted in said clutch basket, each driving friction disk comprising a circular and planar disk with a hollow center portion, with a plurality of positioning tabs extending out from a periphery of each driving friction disks, configured to extend between said fingers, and each driving friction disks configured for frictional engagement with an adjacent driven friction disk;

a plurality of driven friction disks mounted in said clutch basket, each driven friction disk comprising a circular and planar disk with a hollow center portion, with a plurality of engagement tabs extending toward the center of said disks, for engagement with a center clutch which is configured to rotate in relation to said clutch basket, with each driven friction disks configured for frictional engagement with an adjacent driving friction disk;

an expandable friction disk interleaved in said plurality of friction disks, said expandable disk configured to become thicker through rolling contact between a pin, a first and second plate, and at least one centrifugal actuating members, with said centrifugal actuating member configured to move when subjected to a selected amount of centrifugal force and said expandable disk configured to become thinner when said centrifugal force decreases, with said plates and centrifugal actuating members moving over each other by rolling engagement of one or more pins captured between said ramps and said ramp sockets; and wherein said clutch assembly comprises at least one ball socket in said centrifugal actuating member, at least one ball ramp in said first plate, and at least one ball positioned in said ball socket and said ball ramp, with said ramp comprising a radial track with a ramped bottom, with said ball ramp being deeper toward the center of said first plate, and less deep toward said periphery of said first plate.

17. A method of converting a motorcycle clutch, comprising the steps of:

disassembling a clutch of the type having a clutch basket with fingers, a closed first end, open second end, a center clutch, a pressure plate, and friction plates;

placing u shaped wear liners in slots between said fingers in said clutch basket, with said u shaped liners having two side pieces, joined to a bottom piece and forming a u shape, with a capture flange on each side piece, configured for engagement of the inside surface of said fingers of said clutch basket;

placing friction disks of three types in said clutch basket in a combination of friction plates having the same thickness as the group of friction plates removed from the clutch basket, said step of placing friction disks comprising;

placing a plurality of driving friction disks mounted in said clutch basket, each driving friction disk comprising a circular and planar disk with a hollow center portion, with a plurality of positioning tabs extending out from a periphery of each driving friction disks, and each driving friction disks configured for frictional engagement with an adjacent driven friction disk;

placing a plurality of driven friction disks mounted in said clutch basket, each driven friction disk comprising a circular and planar disk with a hollow center portion, with a plurality of engagement tabs extending toward the center of said disks, for engagement with ribs of the center clutch which is configured to rotate in relation to said clutch basket, with each driven friction disks configured for frictional engagement with an adjacent driving friction disk; and placing an expandable disk interleaved in said plurality of friction disks, said expandable disk configured to become thicker when subjected to a selected amount of centrifugal force and to become thinner when said centrifugal force decreases with said expansion cause by rolling contact between parts of said expandable disk;

with said expandable disk comprising a generally planar and circular first plate with an inner and an outer surface, with said first plate inner surface defining at least one generally rectangular ramp, said ramp having a ramped bottom surface, with said ramp being deepest toward the center of the circular first plate, and less deep toward the periphery of said circular first plate, with said ramp oriented transverse to a radial line from the center of said circular first plate, with said ramp configured for engaging a cylindrical pin;

a plurality of centrifugal actuating members in contact with said first plate by rolling contact through a cylindrical pin, with said actuating members having a first side and a second side, with at two pin sockets and pins on opposite sides of said centrifugal actuating member with said pin sockets forming a through slot with said cylindrical pins touching and configured to roll against each other; and a generally planar and circular second plate with an inner and an outer surface, with said second plate inner surface facing said plurality of centrifugal actuating members and defining said ramp corresponding to said pin sockets in said centrifugal actuating members;

with said first and second plates attached to each other by a plurality of springs, and with said plurality of centrifugal actuating members configured to move by centrifugal force in a radial direction toward the periphery of said first and second plates, with said plurality of springs urging said plates closer to each other by pressing said cylindrical pin into send deeper region of said slot, and with said plates configured to move apart due to centrifugal force pressing said centrifugal actuating members toward a periphery of said disks and thus causing said cylindrical pins to move into a less deep portion of said slot;

attaching said pressure plate over said open second end of said clutch basket using springs and spring bolts.

\* \* \* \* \*